Oct. 6, 1959　　　　A. G. TALBERT　　　　2,907,581
REMOVABLE GOOSENECK DRAWBAR FOR TRAILERS AND THE LIKE
Filed March 20, 1957　　　　　　　　　　　3 Sheets-Sheet 1
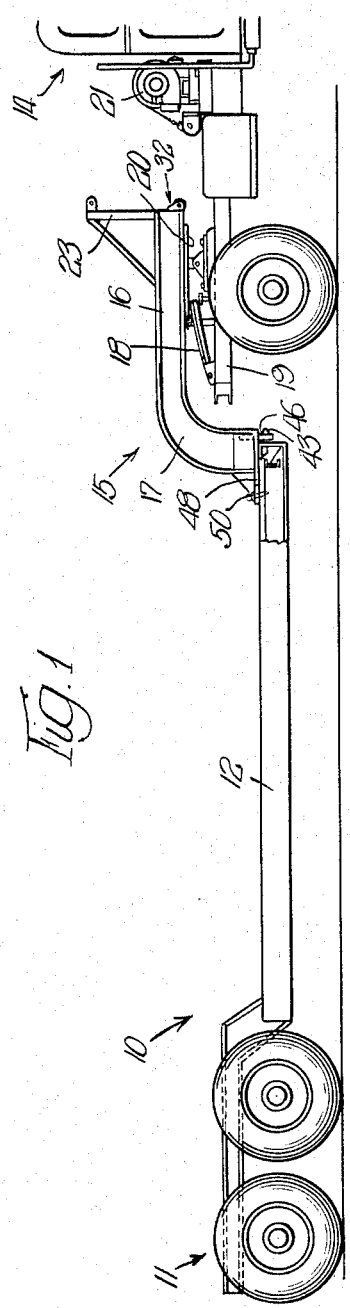
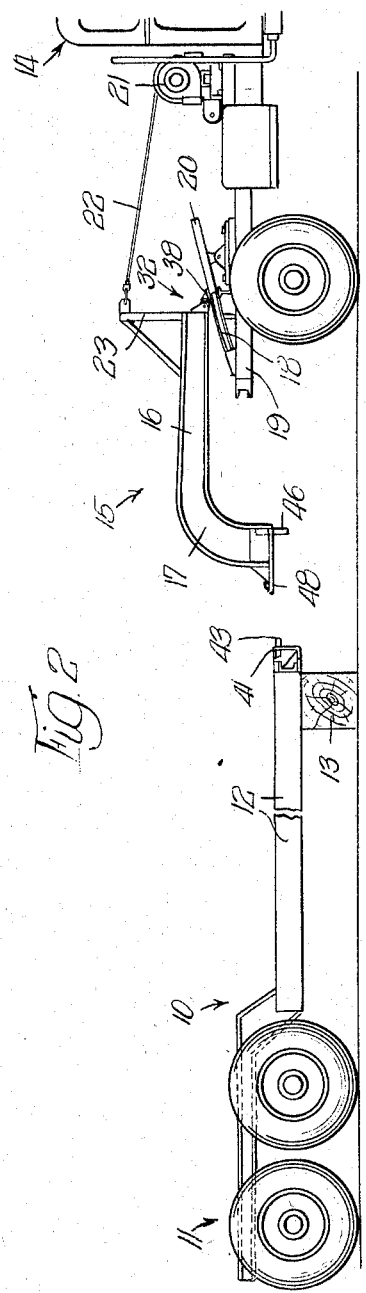
INVENTOR.
Austin G. Talbert,
BY
Cromwell, Greist & Warden
Attys

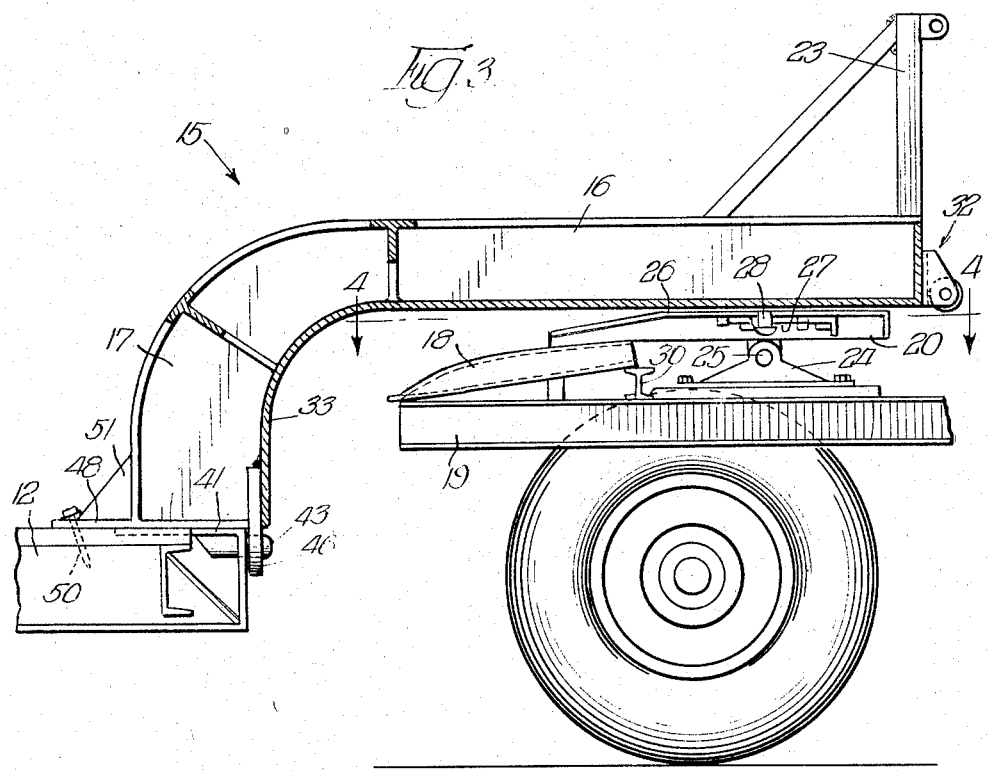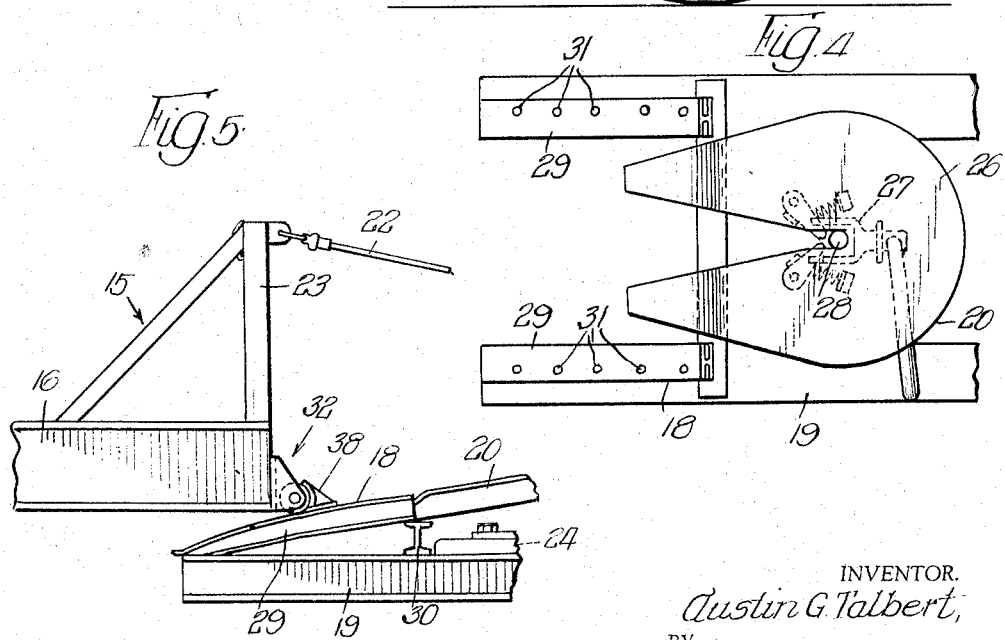

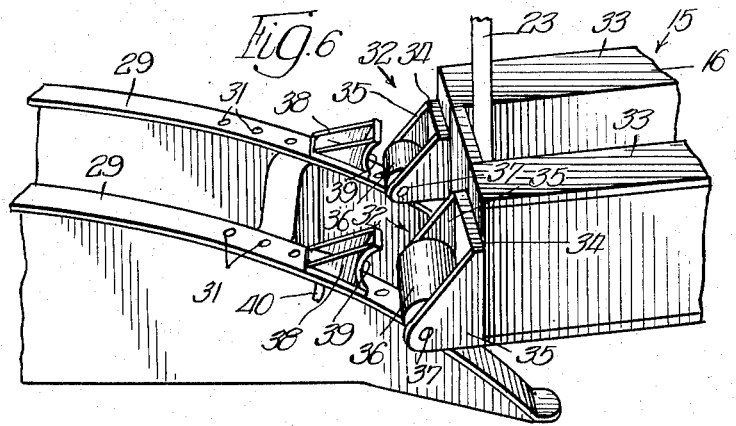
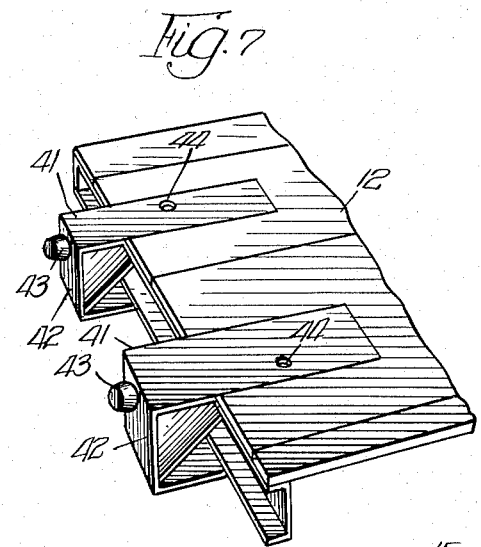
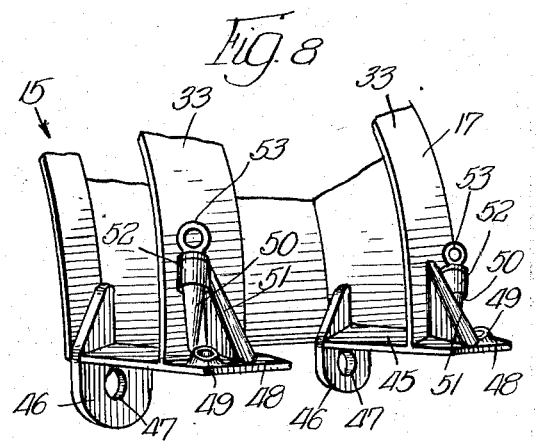
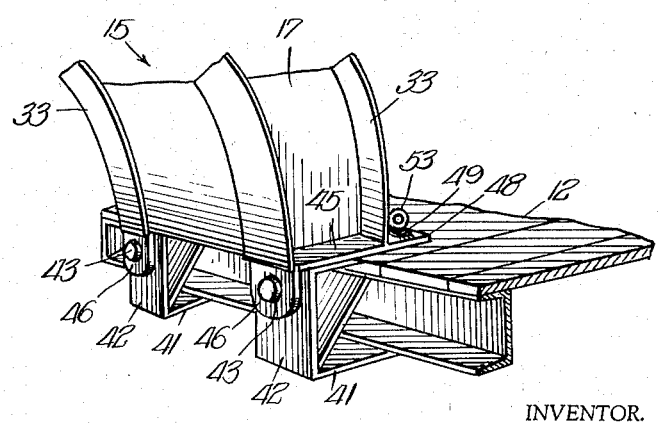

United States Patent Office 2,907,581
Patented Oct. 6, 1959

2,907,581

REMOVABLE GOOSENECK DRAWBAR FOR TRAILERS AND THE LIKE

Austin G. Talbert, Lyons, Ill., assignor to Talbert Construction Equipment Company, Lyons, Ill., a corporation of Illinois Application March 20, 1957, Serial No. 647,282

6 Claims. (Cl. 280—423)

The present invention is directed to a new and improved drawbar attaching arrangement, the drawbar being in the form of a gooseneck designed for detachable interconnection with the forward end of a low-bed trailer and the rear end of a tractor unit to provide a pair of interconnected vehicles, the improvements in the drawbar residing in the means for interconnecting the same with the low-bed portion of the trailer and the means provided thereon and cooperating therewith for improved operation with the rear end portion of the tractor unit. The structural features of the present invention to be described constitute an improvement over certain structural features disclosed in my Patent No. 2,489,112.

Tractor and semi-trailer units are known in which the semi-trailer consists of a vehicle supported on rear wheels and carried at its forward end by means such as an arched drawbar, commonly referred to as a gooseneck. Units of this type are adapted to transport heavy machinery or heavy loads and are primarily constructed as low-bed vehicles to facilitate the loading and unloading thereof. The forward end of the trailer is provided with a detachable connection to the drawbar whereby the drawbar may be disconnected from the trailer while remaining connected to the tractor, so that the low-bed platform of the trailer is unobstructed at its forward end for loading and unloading, thus eliminating the disadvantages attendant upon loading and unloading the trailer from the sides or at the rear. In the use of units so equipped, difficulty has been experienced in aligning the gooseneck with the front end of the trailer for connection thereto, inasmuch as considerable differences in height exist between the trailer and gooseneck when disconnected, due primarily to the fact that the springs of the tractor, when not subjected to the load of the forward end of the trailer, elevate the tractor frame. It therefore becomes expedient to adjust the drawbar vertically with respect to the tractor and trailer.

In my foregoing patent, I disclose a drawbar height adjustment arrangement whereby the drawbar at its forward end is drawn by a winch-operated cable mechanism carried on the rear end of the tractor along an inclined ramp toward or away from an improved form of tiltable fifth wheel assembly. Drawbar stop means provide fulcrum action in combination with operation of the winch, the cable of which is attached to the drawbar, and the rear end of the drawbar may be moved into alignment with the forward end of the low-bed portion of the semi-trailer. With this mechanical arrangement, the rear portion of the drawbar may be readily and easily attached to the forward end of the low-bed portion of the trailer and, following interconnection of the same, the winch is operated to draw the drawbar and attached semi-trailer into operative interconnection with the fifth wheel assembly to complete the articulation of the vehicles.

The particular means by which the drawbar is pivotally fulcrumed and moved along the ramp of the tractor as well as the particular means which interconnect the low-bed portion of the trailer and the drawbar, as disclosed in my patent, have been found to be generally efficient in operation. However, I have since devised new and improved means of the nature described and it is these particular means, which operatively associate and interconnect the drawbar with the tractor and low-bed portion of the trailer, to which the present invention is directed.

Therefore, it is an object of the present invention to provide a new and improved form of interconnecting and operating arrangement for use with a gooseneck drawbar, low-bed trailer and trailer-supporting tractor unit, the arrangement including interconnecting an operating means on the drawbar, trailer and tractor providing for more efficient functioning during and following use of the drawbar in interconnecting the low-bed portion of the trailer and the rear end supporting portion of the tractor.

A further object is to provide a new and improved form of interconnected vehicle arrangement wherein a gooseneck drawbar is interconnected by improved means with a low-bed platform vehicle portion, the drawbar being further readily movable along an inclined ramp of a separate vehicle provided with means for positioning and holding the drawbar for positional adjustment during interconnection of the same with the low-bed platform portion, the drawbar being ultimately movable into interconnected position intermediate the low-bed platform portion and separate vehicle to provide a completely interconnected unit.

Still another object is to provide a new and improved form of gooseneck drawbar having improved vehicle interconnecting and drawbar positioning means at the ends thereof to provide ease of interconnection and operational functioning when the same is used in attaching a low-bed trailer to a power unit such as a tractor.

Other objects not specifically set forth will become apparent from the following detailed description made in conjunction with the drawings wherein:

Fig. 1 is an elevation of an interconnected low-bed semi-trailer and tractor unit utilizing the improved drawbar and interconnecting elements of the present invention, the tractor unit being partially illustrated;

Fig. 2 is a fragmentary view similar to Fig. 1 illustrating the positioning of the drawbar on the rear end portion of the tractor in detached relation with the forward end of the low-bed portion of the semi-trailer;

Fig. 3 is an enlarged fragmentary elevation in partial section illustrating the complete attachment of the trailer and tractor by use of the drawbar;

Fig. 4 is a fragmentary plan view of certain elements carried by the rear portion of the tractor, this view being taken generally along line 4—4 of Fig. 3;

Fig. 5 is a fragmentary elevation illustrating the operation of the forward end of the drawbar with certain elements carried by the rear end portion of the tractor;

Fig. 6 is a fragmentary perspective of the elements of Fig. 5 further illustrating use of the same;

Fig. 7 is a fragmentary perspective of the forward end of the low-bed portion of the trailer illustrating the drawbar attaching elements carried thereby;

Fig. 8 is a fragmentary perspective of the rear end portion of the drawbar illustrating the trailer attaching elements carried thereby; and Fig. 9 is a fragmentary perspective of the interconnected ends of the drawbar and low-bed portion of the trailer.

In Fig. 1, a known type of low-bed, semi-trailer 10 is illustrated as including a wheel-supported rear end portion 11 provided with a low-bed forwardly extending portion 12. The low-bed portion 12 is of known design and use adapted for supporting heavy machinery which is loaded thereonto from the front end thereof when the same is in unattached and disconnected condition as shown in Fig. 2 and suitably supported by a beam or block 13.

Removable ramps, which may be in the form of wooden planks, are laid in inclined relation against the front or sides of the low-bed portion 12 for purposes of moving heavy machinery onto the low-bed portion 12 to load the same in the conventional manner. By use of the low-bed portion 12 with its unattached front and side portions, efficient loading and unloading of heavy equipment can be readily accomplished.

In attaching the trailer 10 to a power unit such as a tractor 14, a known type of gooseneck drawbar 15 is used. The drawbar 15 is provided with a horizontally extending forward portion 16 and a downwardly extending rear portion 17. The rear portion 17 is provided with improved attaching means for interconnecting the same with the forward end of the low-bed portion 12 of the trailer 10. The forwardly extending portion 16 is provided with new and improved operative means for cooperation with an inclined ramp portion 18 carried on the rear platform 19 of the tractor unit 14. The inclined ramp portion 18 cooperates with a tiltable fifth wheel assembly 20 in a manner to be described.

The rear platform 19 of the tractor unit 14 further carries a power operated winch assembly 21 having a cable 22 (Fig. 2) operated thereby which is suitably attached to a superstructure 23 carried by the forwardly extending portion 16 of the drawbar 15. The particular elements and devices described in Figs. 1 and 2 are of known types and generally cooperate with one another in a known manner. The drawbar 15 is used to detachably interconnect the forward end of the low-bed portion 12 of the trailer 10 to the rear platform 19 of the tractor 14 through the fifth wheel assembly 20. Upon interconnection of the vehicles in the manner to be described, the tractor and trailer unit operates in an entirely conventional manner with the drawbar 15 being pivotally interconnected through the fifth wheel assembly 20 with the tractor unit 14 to provide for articulated movement between the tractor unit 14 and trailer unit 10.

Referring to Figs. 3 and 4, the rear platform portion 19 of the tractor unit carries a fifth wheel supporting member 24 including a pivot pin 25 which attaches a fifth wheel plate 26 thereto for pivoting about the horizontal axis of the pin 25. The fifth wheel plate 26 is bifurcated and of conventional design including a releasable latch assembly 27 of known type for attachment to a connecting pivot pin 28 carried by the forwardly extending portion 16 of the drawbar 15. This type of releasable attaching arrangement is entirely conventional and used to articulate the trailer 10 through the gooseneck drawbar 15 to the tractor unit 14.

Rearwardly of the fifth wheel assembly 20 on the rear platform 19 are transversely spaced I-beams 29 which constitute the ramp portion 18. Each of the beams 29 is attached at its rearmost end to the top surface of the platform 19 and is inclined upwardly at its opposite end in resting engagement with a transverse I-beam 30 which extends across the rear platform 19. The top surfaces of the beams 29 are provided with a plurality of longitudinally spaced apertures 31 for a purpose to be described. The bifurcated end portions of the fifth wheel plate 26 are received between the ramps 29 to allow the plate 26 to be tilted about the mounting pin 25 in conforming inclined relation with the ramps 29.

In Figs. 5 and 6, the forward end of the forwardly extending portion 16 of the gooseneck 15 is illustrated as carrying spaced roller assemblies 32, the forward end of the gooseneck 15 being defined by transversely spaced structural members 33 in line with conventional design of the same. The spaced structural members 33 are formed from I-beams which have their sides enclosed by steel plates and are suitably interconnected by a transverse sheet of metal. Each of the roller assemblies 32 includes a bracket plate 34 having spaced forwardly projecting ears 35 integrally formed therewith which house therebetween a roller 36 rotatably carried by a pin 37 suitably journalled in the ears 35.

The cable attaching superstructure 23 extends upwardly from the forward end of the drawer 15 as particularly shown in Fig. 5 and the cable 22 is suitably attached thereto in any known manner. In positioning the drawbar 15 along the ramps 29 for adjustment of the rear end portion of the drawbar prior to attachment of the same with the forward end of the low-bed portion 12 of the trailer, the roller assemblies 32 are placed in engagement with the top surfaces of the ramps 29 and the cable 22 is attached to the superstructure 23. Upon operation of the winch 21, the forward end of the drawbar 15 is drawn upwardly along the ramps 29 until contact is made between the rollers 36 and stops or chocks 38 carried by the ramps 29. Each of the chocks 38 is provided with a front arcuate surface 39 designed for engagement with a roller 36 as particularly shown in Fig. 5. In Fig. 6 the foremost chock 38, as viewed, is illustrated as including a depending stud 40 which is received through one of the apertures 31 in a ramp 29. Thus, each of the chocks 38 is removably positioned along its respective ramp 29 by having the stud 40 thereof inserted through one of the apertures 31. By proper location of the chocks 38, the extent to which the drawbar 15 is moved upwardly along the ramps 29 is regulated thus permitting upward movement of the drawbar 15 to an extent that the bottom portion of the downwardly extending portion 17 becomes generally aligned with the forward end of the low-bed portion 12 of the trailer 10.

Upon engagement of the rollers 36 with the chocks 38, a fulcrum action is provided by means of which the drawbar may be pivoted so as to move the rear end thereof into perfect alignment with the forward end of the low-bed portion 12 of the trailer 10. By continued operation of the winch 21 and winding or unwinding of the cable 22, the rear end of the drawbar 15 may be pivoted about the fulcrum defined by the chocks 38 in engagement with the rollers 36. Thus, the pins 37 not only provide journal means for allowing friction reducing rotation of the rollers 36 during movement of the forward end of the drawbar along the ramps 29, but further define pivot points about which the drawbar may be moved following engagement between the rollers 36 and the arcuate faces 39 of the chocks 38. Specific alignment of the rear end portion of the drawbar 15 can be accomplished with the forward end of the low-bed portion 12 of the trailer 10. Subsequent movement of the tractor unit 14 toward the forward end of the trailer 10 allows attachment between the drawbar 15 and low-bed portion 12 in a manner to be described.

Once interconnection of the drawbar 15 with the trailer 10 has been completed, the chocks 38 are removed from their respective ramps 29 and the winch 21 is operated to wind or shorten the cable 22 and draw the forward end of the gooseneck 15 upwardly along the ramps 29 toward the fifth wheel assembly 20. By tilting the fifth wheel plate 26 in the manner previously described, the roller assemblies 32 may be drawn continuously upwardly into engagement with the plate 26 until the pin 28 carried by the drawbar 15 is suitably engaged by the latch assembly 27. The interconnection between the forward end of the drawbar 15 and the tractor unit 14 is thus completed and the forward end of the trailer 10 is suitably supported by the tractor unit 14 through the drawbar 15. To disconnect the trailer 10 from the tractor unit 14, the reverse procedure can be followed, this procedure being accomplished in the obvious manner.

Figs. 7–9 illustrate the manner in which the rear end portion of the drawbar 15 is detachably connected to the forward end of the low-bed portion 12 of the trailer 10. In Fig. 7 the forward end of the low-bed portion 12 includes forwardly projecting attaching members 41 which are provided with vertically extending forward faces 42. The plates defining the faces 42 carry stub shafts 43 which project outwardly therefrom and which are tapered or rounded at the outermost ends thereof. Rearwardly of the front edge of the low-bed portion 12, the drawbar attaching members 41 are each provided with a drilled hole 44 which extends downwardly through the top plate thereof for a purpose to be described.

Fig. 8 illustrates the improved structure of the rearmost portion of the drawbar 15 used in attaching the drawbar with the forward end of the low-bed portion 12 of the trailer 10. As previously described, the drawbar 15 is formed from spaced I-beam members 33 interconnected by transverse sheets to form a unitary structure. The bottom end of each I-beam 33 at the downwardly directed rearmost portion 17 of the drawbar 15 is provided with a horizontal plate 45. The front edge of each plate 45 has attached thereto a downwardly depending flange 46 which is centrally apertured to define an opening 47 through which one of the stub shafts 43 of the low-bed trailer portion 12 is received as shown in Fig. 9. The flanges 46 are designed for engagement with the front vertical faces 42 of the drawbar attaching members 41 of the low-bed trailer portion 12 and the tapered ends of the stub shafts 43 provide self-aligning action within their respective apertures 47.

The bottom plates 45 further define rearwardly extending flat flanges 48 which extend over the top surfaces of the drawbar attaching members 41 of the low-bed trailer portion 12. Each of the flanges 48 is of substantial width and length and is designed for full surface area engagement with the drawbar attaching members 41, as shown in Fig. 9. Each flange 48 carries a substantially vertically directed sleeve or collar 49 defining an aperture through which a tapered pin 50 is received to interconnect the drawbar 15 with the low-bed trailer portion 12. The aperture defined by the collar 49 in each flange 48 is aligned with an aperture 44 in the drawbar attaching portions 41 of the trailer and each pin 50 extends through the aligned apertures to fixedly interconnect the drawbar and trailer.

With the drawbar and trailer assembly attached in the manner shown in Fig. 9, it will be noted that the cooperating stub shafts 43 and flanges 46 prevent relative movement between the drawbar and trailer in a vertical plane while the pins 50 interconnect the assembly to prevent relative horizontal movement. Thus, the drawbar 15 and low-bed portion 12 of the trailer are efficiently interconnected in a relatively simple manner, the interconnections being such that the substantial weight carried by the low-bed portion 12 is adequately transmitted through the drawbar 15 to the supporting tractor unit 14. The horizontal flange portions 48 are reinforced by inclined tubular members 51 which extend between the I-beams 33 and the top surfaces of the flanges 48. Pin holding collars 52 are attached to the I-beams 33 for pin storage purposes as shown in Fig. 8 when the drawbar 15 is detached from the trailer 10. Each of the pins 50 is provided with a ring formation 53 at the top thereof to provide for easy grasping of each pin insertion for removal purposes.

In the manner previously described and as shown in Fig. 2, the drawbar 15 may be pivoted about its abutment with the chocks 38 along the inclined ramps 29 to raise or lower the end 17 thereof into alignment with the forward end of the trailer 10. Once general alignment has been obtained, the tractor unit 14 can be moved toward the trailer 10 and the tapered stub shafts 43 will cooperate with the apertured flanges 46 to be received therethrough. The pins 50 are inserted through the aligned apertures provided therefor and complete attachment between the drawbar 15 and trailer 10 is accomplished without the necessity of moving or otherwise supporting the substantial weight carried by the low-bed trailer portion 12. Once complete attachment between the drawbar 15 and trailer 10 is accomplished, the winch 21 is operated to pull the drawbar 15 upwardly along the ramps 29 and into latched attachment with the fifth wheel assembly 20. The forward end of the drawbar 15 will automatically return the fifth wheel plate 26 into its horizontal position as shown in Fig. 3 to complete the interconnecting operation and thus provide a completely articulated trailer and tractor unit.

From the foregoing, it will be apparent that the improved form of interconnecting means carried by the downwardly extending portion 17 of the drawbar 15 and the forward end of the low-bed trailer portion 12 provide an uncomplicated and efficient method interconnection requiring little effort or skill on the part of the operator in completing the same. Still further, the roller and chock arrangement set up between the forward end of the drawbar 15 and the inclined ramp assembly 18 provides for efficient movement and positioning of the drawbar 15 with or without the trailer 10 attached thereto. The trailer and tractor interconnecting operation can be accomplished within a short time and in an uncomplicated manner. The particular attaching arrangements can be applied to any suitable type of low-bed trailer structure and tractor unit and for this reason the structural details of these vehicles have not been described in detail.

Obviously many modifications and variations of the invention as hereinbefore set forth may be made without departing from the spirit and scope thereof, and therefore only such limitations should be imposed as are indicated in the appended claims.

I claim:

1. A low-bed trailer including a wheel supported rear end portion and a removable gooseneck drawbar front end portion for pivotal and supported connection with a tractor, said drawbar having a forwardly extending portion for overlying the rear end of the tractor and a downwardly extending portion removably attached at the bottom thereof with the forward end of the low bed of said trailer, the bottom of the downwardly extending portion of said drawbar being provided with spaced centrally apertured depending flanges having received through the apertures thereof stub shafts carried by the forward end of said bed, the outer end surface of each stub shaft being rounded for self-aligning action within the apertures of said depending flanges, a drawbar mounting flange of substantial width integral with the downwardly extending portion of said drawbar and extending rearwardly therefrom in overlapping engagement with the top surface of said bed, and removable mounting flange and bed connecting means fixedly attaching said drawbar to said bed.

2. A low-bed trailer including a wheel supported rear end portion and a removable gooseneck drawbar front end portion for pivotal and supported connection with a tractor, said drawbar having a forwardly extending portion for overlying the rear end of the tractor and a downwardly extending portion removably attached at the bottom thereof with the forward end of the low bed of said trailer, the forwardly extending portion of said drawbar carrying spaced rollers for movement of said drawbar along spaced supporting surfaces mounted on the rear end of the tractor, the bottom of the downwardly extending portion of said drawbar being provided with spaced centrally apertured depending flanges having received through the apertures thereof stub shafts carried by the forward end of said bed, the outer end surface of each stub shaft being rounded for self-aligning action within the apertures of said depending flanges, a drawbar mounting flange of substantial width integral with the downwardly extending portion of said drawbar and extending rearwardly therefrom in overlapping engagement with the top surface of said bed, and removable mounting flange and bed connecting means fixedly attached to said drawbar to said bed.

3. Interconnected vehicles including a tractor and low-bed semi-trailer, said tractor including a rear platform on which is mounted a fifth wheel, an inclined ramp on said platform extending inwardly from the end thereof toward said fifth wheel, and a cable winch mounted inwardly of said fifth wheel, said trailer including a wheel supported rear end portion and a removable gooseneck drawbar front end portion in pivotal and supported connection with said fifth wheel, said drawbar having a forwardly extending portion overlying the platform of said tractor and a downwardly extending portion removably attached at the bottom thereof with the forward end of the low bed of said trailer, the forwardly extending portion of said drawbar carrying spaced rollers for movement of said drawbar along said ramp in response to operation of said winch the cable of which is connected to said drawbar, the bottom of the downwardly extending portion of said drawbar being provided with spaced centrally apertured depending flanges having received through the apertures thereof stub shafts carried by the forward end of said bed, the outer end surface of each stub shaft being rounded for self-aligning action within the apertures of said depending flanges, a drawbar mounting flange of substantial width integral with the downwardly extending portion of said drawbar and extending rearwardly therefrom in overlapping engagement with the top surface of said bed, and removable mounting flange and bed connecting means fixedly attaching said drawbar to said bed.

4. Interconnected vehicles including a tractor and low-bed semi-trailer, said tractor including a rear platform on which is mounted a fifth wheel, an inclined ramp on said platform extending inwardly from the end thereof toward said fifth wheel, and a cable winch mounted inwardly of said fifth wheel, said trailer including a wheel supported rear end portion and a removable gooseneck drawbar front end portion in pivotal and supported connection with said fifth wheel, said drawbar having a forwardly extending portion overlying the platform of said tractor and a downwardly extending portion removably attached at the bottom thereof with the forward end of the low bed of said trailer, the forwardly extending portion of said drawbar carrying spaced rollers for movement of said drawbar along said ramp in response to operation of said winch the cable of which is connected to said drawbar, the bottom of the downwardly extending portion of said drawbar being provided with spaced centrally apertured depending flanges having received through the apertures thereof stub shafts carried by the forward end of said bed, the outer end surface of each stub shaft being rounded for self-aligning action within the apertures of said depending flanges, each of said depending flanges having associated therewith a drawbar mounting flange of substantial width integral with the downwardly extending portion of said drawbar and extending rearwardly therefrom in overlapping engagement with the top surface of said bed, and removable mounting flange and bed connecting means fixedly attaching said drawbar to said bed, said connecting means being in the form of a removable pin for each mounting flange and extending downwardly through aligned openings in each mounting flange and said bed.

5. In combination, a tractor and gooseneck drawbar for attachment to a low-bed semi-trailer to support the front end thereof, said tractor including a rear platform on which is mounted a fifth wheel, an inclined ramp on said platform extending inwardly from the end thereof toward said fifth wheel, removable chocks carried by said ramp, and a cable winch mounted inwardly of said fifth wheel, said drawbar having a forwardly extending portion overlying the platform of said tractor and a downwardly extending portion for removable attachment at the bottom thereof with the forward end of a low-bed semi-trailer, the forwardly extending portion of said drawbar carrying spaced rollers for movement of said drawbar along said ramp in response to operation of said winch the cable of which is connected to said drawbar, each of said rollers being in abutting engagement with an arcuate abutment face of a chock at a point along said ramp, said drawbar being pivotal about said rollers by the common connection therebetween and in response to the operation of said winch to position the downwardly extending portion relative to the front end of a low-bed semi-trailer for attachment thereto.

6. In combination, a tractor and gooseneck drawbar for attachment to a low-bed semi-trailer to support the front end thereof, said tractor including a rear platform on which is mounted a fifth wheel, an inclined ramp on said platform extending inwardly from the end thereof toward said fifth wheel, removable chocks carried by said ramp, and a cable winch mounted inwardly of said fifth wheel, said drawbar having a forwardly extending portion overlying the platform of said tractor and a downwardly extending portion for removable attachment at the bottom thereof with the forward end of a low-bed semi-trailer, the forwardly extending portion of said drawbar carrying spaced rollers for movement of said drawbar along said ramp in response to operation of said winch the cable of which is connected to said drawbar, each of said rollers being in abutting engagement with an arcuate abutment face of a chock at a point along said ramp, said drawbar being pivotal about said rollers by the common connection therebetween and in response to the operation of said winch to position the downwardly extending portion relative to the front end of a low-bed semi-trailer for attachment thereto, the downwardly extending portion of said drawbar being provided at the bottom thereof with spaced centrally apertured depending flanges arranged for receiving therethrough attaching pin-like members carried by the forward end of a low-bed semi-trailer, said downwardly extending portion being further provided with an outwardly directed mounting flange extending rearwardly therefrom for overlapping connection with the top surface of the bed of said semi-trailer.

References Cited in the file of this patent
UNITED STATES PATENTS

| | | |
|---|---|---|
| 2,144,243 | Fraser et al. | Jan. 17, 1939 |
| 2,489,112 | Talbert | Nov. 22, 1949 |
| 2,613,945 | Talbert | Oct. 14, 1952 |